(No Model.)
R. R. SPEARS.
LATHE FOR TURNING AXLES.
No. 475,163. Patented May 17, 1892.
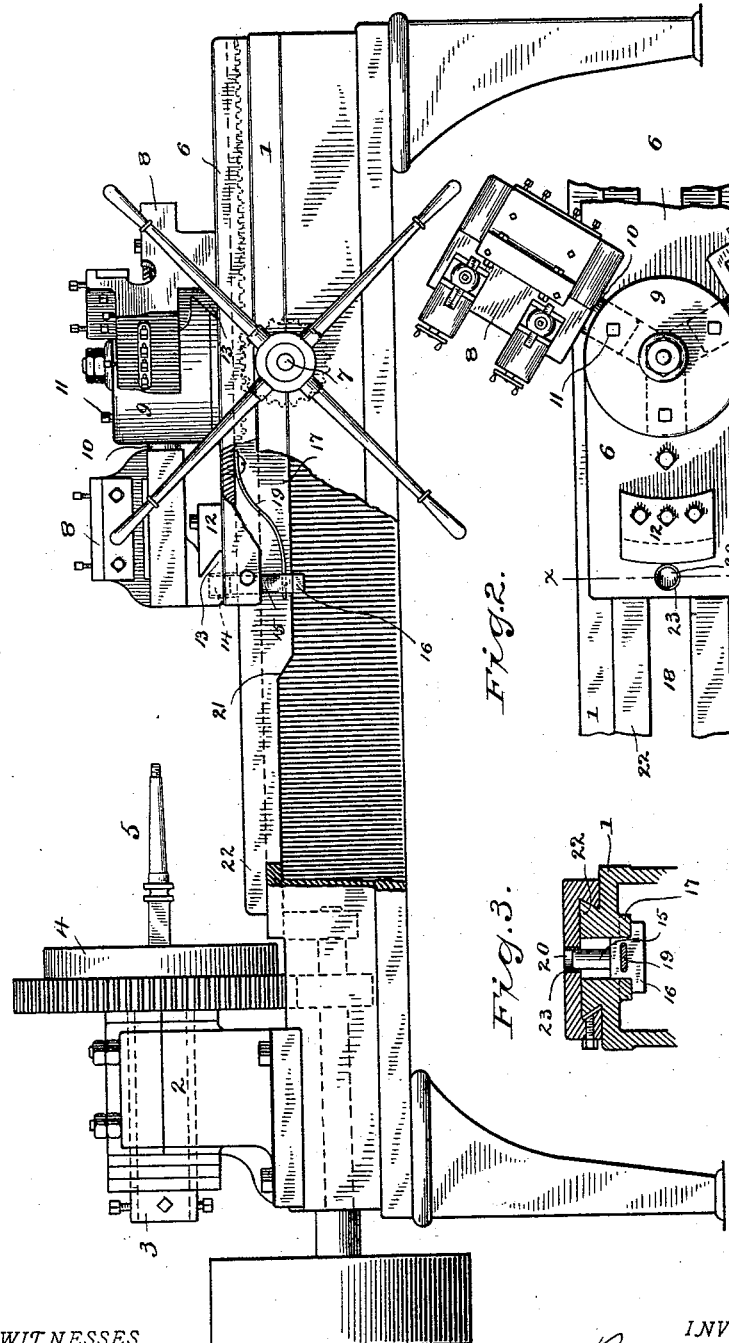
WITNESSES
H. A. Lands
Edith G. Ely.
INVENTOR
Ralph R. Spears
By
A. M. Wooster
Atty.
THE NORRIS PETERS CO., PHOTO-LITHO., WASHINGTON, D. C.

UNITED STATES PATENT OFFICE.

RALPH REED SPEARS, OF WHEELING, WEST VIRGINIA, ASSIGNOR TO FRANK W. BEERS, OF BRIDGEPORT, CONNECTICUT.

LATHE FOR TURNING AXLES.

SPECIFICATION forming part of Letters Patent No. 475,163, dated May 17, 1892.

Application filed January 22, 1892. Serial No. 418,951. (No model.)

*To all whom it may concern:*

Be it known that I, RALPH REED SPEARS, a citizen of the United States, residing at Wheeling, in the county of Ohio and State of West Virginia, have invented certain new and useful Improvements in Lathes for Turning Axles; and I do hereby declare the following to be a full, clear, and exact description of the invention, such as will enable others skilled in the art to which it appertains to make and use the same.

My invention has for its object to simplify and improve the construction of this class of lathes, so as to enable the carriage to be lengthened, thereby increasing the bearing-surface. This result I accomplish by providing a stop-block on the carriage itself, which acts, in connection with a spring-bolt in the carriage, to lock the tool-holders when in operative position against lateral movement and at the same time to provide a rigid bearing to receive and take up the back-pressure upon the tool-holders, thereby preventing the slightest looseness of the parts in use and insuring that round axles may be turned with absolute accuracy even after long continued use of the machine.

With these ends in view I have devised the simple and novel construction of which the following description, in connection with the accompanying drawings, is a specification, numbers being used to designate the several parts.

Figure 1 is a side elevation of my improved lathe complete, a portion of the side of the bed being broken away; Fig. 2, a partial plan view of the bed and carriage, showing the stop-block and rotating head or turret with two tool-holders in position; and Fig. 3 is a section on the line *x x*, Fig. 2, looking toward the left.

1 denotes the bed, at one end of which is a bearing 2, in which is journaled a hollow mandrel 3, to which power is applied in any suitable manner, as by means of the belt-pulley, shaft, and gear shown in the drawings. At the inner end of the mandrel is a chuck 4 of any suitable construction, which is adapted to carry the axle 5 to be operated upon. At the other end of the bed is a carriage 6, sliding on ways 22 on the bed, said carriage having on its under side rack-teeth, which are engaged by a pinion (see dotted lines, Fig. 1) on a shaft 7, which is operated by hand to move the carriage and the operating-tools toward or from the axle carried by the chuck.

8 denotes suitable tool-holders, and 9 a rotating head or turret by which they are carried, the rotating head being provided with openings (see dotted lines, Fig. 2) to receive the shanks 10 of the tool-holders, said tool-holders being locked in position in the rotating head by set-screws 11. Near the forward end of the carriage is rigidly bolted a stop-block 12, the forward end of which is an arc of a circle, and is undercut, as clearly shown, so as to be engaged by backwardly-extending tongues 13 upon the tool-holders. The exact shape of the stop-block and the tongue is of course not of the essence of my invention. It is sufficient to provide any suitably-shaped tongue to engage under the overhanging portion of the stop-block. At the forward end of each tool-holder, in its under side, is a socket 14, (see dotted lines in Fig. 1,) which is adapted to be engaged by a bolt 15, carried by a T-shaped block 16, the ends of which engage under ribs 17 on the under side of the bed on opposite sides of the central slot 18. The block and bolt are forced upward toward the locking position by a spring 19, secured to the under side of the carriage. Ribs 17 are made high enough at their rear ends to hold the bolt in the retracted position—that is, the upper or engaging end of the bolt is retained in the opening 20 in the carriage through which it passes—but when the carriage is moved forward toward the operative position the ends of the bolt ride down inclines 21 upon the reduced forward ends of the ribs, so that spring 19 is permitted to move the bolt upward through openings 20 and into engagement with socket 14, whereby the tool-holder, which has been placed in operative position, is rigidly locked against lateral movement.

In practice the ends of sockets 14 are beveled at their outer edges, so as to permit the bolt to engage readily, and both opening 20 and the socket are provided with bushings 23, which may be readily removed and replaced should they become worn in use. This locking of the tool-holders in operative position, so that there can be no looseness of the parts, which quickly produces lost motion in use, is a very important feature of construction, for the reason that in other machines of this class there has been no means of preventing increasing looseness of the parts, so that after the machines had been run for awhile it was wholly impossible to turn round axles, the result being that very imperfect work was produced or else a number of parts had to be frequently replaced by new ones. It will be seen that as the tool-holders move forward while the tools are operating upon the axle, in addition to the lateral strain upon the tool-holders, which is wholly prevented by the engagement of the bolt with the socket, there is a backward pressure upon the tool-holders, which in the present instance is entirely taken up by the stop-block 12.

Having thus described my invention, I claim—

1. In a machine of the class described, the combination, with the carriage and the tool-holders, each of which is provided with a backwardly-extending tongue and in its under side with a socket, of a stop-block upon the carriage, the forward end of which is undercut to correspond with the tongue, and a spring-actuated bolt upon the carriage adapted to engage the sockets in the tool-holders, so that the tool-holder in use is held against lateral movement and the back-pressure is taken up, thereby preventing looseness of the parts.

2. The combination, with the bed having a central slot and on opposite sides thereof ribs made highest at their rear ends and reduced at their forward ends, the carriage and tool-holders, each of which is provided with a backwardly-extending tongue, and a socket in its under side, of a stop-block upon the carriage, the forward end of which is an arc of a circle and is undercut to receive the tongue, a bolt carried by a T-shaped block, the ends of which engage the ribs, and a spring secured to the block and the carriage, by which the bolt is moved upward toward the locking position, so that when the carriage is retracted the ends of the block will engage the rear ends of the ribs, holding the bolt out of locking position, and when the carriage is moved forward the reduced forward ends of the ribs will permit the spring to raise the bolt into engagement with the socket.

3. The bed having a central slot and ribs on opposite sides thereof, the forward ends of said ribs being reduced, as shown, in combination with the carriage having a stop-block undercut in its forward side, a spring-actuated bolt carried by a block, the ends of which engage the ribs, and the tool-holders, each of which is provided with a backwardly-extending tongue adapted to engage the stop-block, and a socket adapted to receive the bolt when the carriage is moved forward and the ends of the block ride down upon the reduced portion of the ribs.

In testimony whereof I affix my signature in presence of two witnesses.

RALPH REED SPEARS.

Witnesses:
FRANK SCHROEDER,
JOHN W. SCHULTZE.